United States Patent
Ismaier et al.

(10) Patent No.: US 7,338,728 B2
(45) Date of Patent: Mar. 4, 2008

(54) FUEL CELL BLOCK INCLUDING A WATER SEPARATOR

(75) Inventors: Norbert Ismaier, Hausen (DE); Josef Lersch, Heroldsbach (DE); Arno Mattejat, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 627 days.

(21) Appl. No.: 10/491,104

(22) PCT Filed: Sep. 16, 2002

(86) PCT No.: PCT/EP02/10373

§ 371 (c)(1),
(2), (4) Date: Mar. 26, 2004

(87) PCT Pub. No.: WO03/030291

PCT Pub. Date: Apr. 10, 2003

(65) Prior Publication Data

US 2004/0247984 A1    Dec. 9, 2004

(30) Foreign Application Priority Data

Sep. 27, 2001  (EP) ............................ 01123174

(51) Int. Cl.
*H01M 2/02*      (2006.01)
(52) U.S. Cl. .................. 429/34; 429/38; 429/39
(58) Field of Classification Search ............ 429/34, 429/38, 39, 32, 30, 26, 22, 24, 25
See application file for complete search history.

(56) References Cited

U.S. PATENT DOCUMENTS

| | | | |
|---|---|---|---|
| 3,395,047 A | * | 7/1968 | Terry et al. .................. 429/35 |
| 6,653,008 B1 | | 11/2003 | Hirakata et al. |
| 2001/0033955 A1 | * | 10/2001 | Mirsch et al. ............... 429/26 |

FOREIGN PATENT DOCUMENTS

| | | |
|---|---|---|
| DE | 198 22 697 C1 | 10/1999 |
| DE | 100 49 801 A1 | 4/2001 |
| DE | 199 53 799 A1 | 5/2001 |
| EP | 0 959 511 A2 | 11/1999 |
| EP | 1 088 359 B1 | 4/2001 |
| EP | 1 098 381 A1 | 5/2001 |
| JP | 01-181681 A | 7/1989 |

(Continued)

OTHER PUBLICATIONS

Japanese Office Action dated Aug. 30, 2007, for corresponding Japanese Patent Application No. 2003-533373, with English translation.

*Primary Examiner*—Raymond Alejandro
(74) *Attorney, Agent, or Firm*—Harness, Dickey & Pierce, PLC

(57) ABSTRACT

A fuel cell block includes a plurality of channels and pipings and a resulting plurality of connecting and sealed points. Vibrations of the fuel cell block, particularly in vehicles, lead to stress and fatigue of sealed points. This causes a safety problem during operation of the fuel cell block. In order to solve the problem, the fuel cell block includes an end plate, an operating material channel that goes through the end plate and an operating material control device arranged at least partly in the operating material channel. The operating material control device is integrated at least partly into the end plate.

14 Claims, 2 Drawing Sheets

FOREIGN PATENT DOCUMENTS

| | | |
|---|---|---|
| JP | 8-195215 | 7/1996 |
| JP | 10-261426 A | 9/1998 |
| JP | 2000-90954 A | 3/2000 |
| JP | 2000-164240 A | 6/2000 |
| JP | 2001-6718 | 1/2001 |
| JP | 2001-110439 A | 4/2001 |
| JP | 2001-143734 | 5/2001 |

* cited by examiner

FUEL CELL BLOCK INCLUDING A WATER SEPARATOR

This application is the national phase under 35 U.S.C. § 371 of PCT International Application No. PCT/EP02/10373 which has an International filing date of Sep. 16, 2002, which designated the United States of America and which claims priority on European Patent Application number EP 01123174.3 filed Sep. 27, 2001, the entire contents of which are hereby incorporated herein by reference.

FIELD OF THE INVENTION

The invention generally relates to a fuel cell block having a number of planar fuel cells stacked on top of one another, an end plate and an operating-medium passage which runs through the end plate.

BACKGROUND OF THE INVENTION

During the electrolysis of water, the water molecules are broken down into hydrogen ($H_2$) and oxygen ($O_2$) by electric current. In a fuel cell, inter alia this operation takes place in reverse. Electrochemical combining of hydrogen and oxygen to form water results in the formation of electric current with a high level of efficiency and, if the fuel gas used is pure hydrogen, without the emission of pollutants and carbon dioxide ($CO_2$).

Technical implementation of the principle of the fuel cell has led to various solutions, specifically with different types of electrolytes and with operating temperatures of between 80° C. and 1000° C. Depending on their operating temperature, the fuel cells are classified as low-temperature, medium-temperature and high-temperature fuel cells. These are in turn different from one another by virtue of differing technical implementations.

For operation, operating media, such as for example the operating gases, humidification water and cooling water, are fed to a fuel cell. The operating gases used are a hydrogen-containing fuel gas and an oxygen-containing oxidation gas. Examples of the fuel gases which can be used include natural gas, coal gas or pure hydrogen, while the oxidation gas used is generally air or pure oxygen.

Humidification water is fed to some embodiments of low-temperature fuel cells, in particular fuel cells with a polymer electrolyte membrane (PEM fuel cells), the membrane of which has to be kept moist. In this case, the operating gases are heated in a suitable device, for example a liquid ring compressor or in humidifier cells, to the temperature of the fuel cell and saturated with steam.

A single fuel cell supplies an operating voltage of at most approximately 1.1 V. Therefore, a large number of fuel cells are connected up to form a fuel cell stack which forms part of a fuel cell block. Connecting the fuel cells in series makes it possible to achieve an operating voltage of a fuel cell block of 100 V and above.

In addition to at least one fuel cell stack, a fuel cell block generally also comprises a humidifying cell stack and what is known as an operating part, also known as the supply part. The humidifying cell stack includes a number of cells in which the operating gases are humidified with the aid of a membrane. The supply part accommodates units such as, for example, pumps, compressors and humidifiers, as well as equipment such as valves, sensors, electronic monitoring devices, water separators and more.

The units are connected up by a large number of lines and pipe connections. These pipe connections are fundamentally susceptible to leaks. In this context, leaks in lines which carry an operating gas represent a particular risk to operating safety, since the use of hydrogen-containing and oxygen-containing operating gases means that there is a risk of a fire and possibly even explosions around a leak. When a fuel cell block is being used in a vehicle, an additional difficulty is that the fuel cell block is subject to shocks and vibrations.

SUMMARY OF THE INVENTION

An object of an embodiment of the invention is to provide a fuel cell block which satisfies high safety demands relating to the sealing of the pipe connections even in the event of operation which is characterized by vibrations.

An object may be achieved by a fuel cell block in which, according to an embodiment of the invention, an operating-medium control device is at least partially arranged in the operating-medium passage and is at least partially integrated in the end plate.

An operating-medium control device is to be understood as meaning a device which can be used to influence the quantity or state of an operating medium or to measure the state of the operating medium (for example its pressure or temperature). Examples of an influencing operating-medium control device include a valve, an actuator or a water separator, and examples of a measuring operating-medium control device include a flow monitor or a sensor, such as for example a temperature sensor, a measured value pick-up, a pressure gauge or a level indicator.

The various components of a fuel cell block, i.e. the fuel cell stack(s), if appropriate a humidifying cell stack and the supply part, are delimited by at least one end plate, and generally by an end plate on both sides. An end plate is therefore located at one end of the fuel cell block or between two of its components.

An end plate is generally a stable metal plate which imparts a certain stability to the fuel cell block. An end plate arranged between two components is also known as an intermediate plate. The end plate which delimits the supply part on the outer side accommodates connections for the fuel cell block. Lead-throughs for, for example, the operating-medium feeds, exhaust gas discharges, lead-throughs for tapping off the electric current which is generated or measurement signals are incorporated in this end plate, which is also known as the connection plate.

An end plate which delimits a fuel cell stack or a humidifying cell stack is arranged adjacent to in each case the outermost interconnector plate or separating plate of the stack. Further, depending on the particular embodiment of the fuel cell block, it is also possible for further components to be located between the outermost interconnector plate and the end plate.

An embodiment of the invention includes consideration that the fewer sealing locations and connecting locations in the operating-medium feed and discharge lines in the supply part of the fuel cell block, the higher the operating safety of a fuel cell block. Moreover, an embodiment of the invention includes consideration that the higher the mechanical load to which a connecting location, for example a connection between a pipe section and a valve, is exposed, the more susceptible this connecting location is to leaks.

When an operating medium, for example an operating gas, is being supplied to the fuel cells, the operating gas is first of all passed through the connection plate by means of a connection, then, inside the supply part, passes through a pipe section before then reaching a valve which is used to control the supply of operating gas to the fuel cell stack.

A reduction in the number of connecting locations inside the supply part of the fuel cell block is achieved if the valve is arranged directly at the connection plate. This eliminates the pipe section between connection plate and valve. To allow particularly high loads to be applied to the connecting location between connection plate and valve, the valve is partially integrated in the connection plate. By way of example, a valve seat is formed into the connection plate, and during assembly of the fuel cell block the valve is inserted fixedly into this valve seat. The valve and connection plate therefore form a fixed assembly. The result of this is that the seal within the connecting location between valve and connection plate is only exposed to very low levels of mechanical load.

As a result of an operating-medium control device being at least partially integrated in an end plate of a fuel cell block, pipe sections which have hitherto been customary between an end plate of this type and an operating-medium control device can be eliminated. As a result, the number of connecting locations inside the fuel cell block is reduced. Therefore the operating safety and reliability with regard to leaks inside the fuel cell block are increased.

The partial integration results in the operating-medium control device being rigidly connected to the end plate and a sealing location between the end plate and the operating-medium control device being arranged inside the end plate. This results in the level of mechanical load on this sealing location being low, which in turn increases the operating safety of the fuel cell block.

This advantage is achieved in particular if the operating-medium control device is fully integrated in the end plate and is therefore completely accommodated by the end plate. Working on the basis of the example of the valve outlined above, this means that the valve is completely incorporated in the end plate and therefore the sealing location between connection plate and valve, and also the sealing location between valve and a downstream pipe part or a further operating-medium control device, are arranged directly in or at the end plate. As a result, both sealing locations are only exposed to low levels of mechanical load.

If an operating-medium control device is fully integrated in the end plate, it is even possible, under certain circumstances, for the sealing location between end plate and operating-medium control device to be dispensed. This occurs because the operating-medium control device merges seamlessly into the end plate.

An embodiment of the invention provides the additional advantage that, as a result of the at least partial integration of an operating-medium control device in the end plate, pipe sections and therefore also space are saved. The supply part and therefore the entire fuel cell block can as a result be of compact design. The assembly including the fuel cell stack and supply part is therefore made particularly stable and space-saving by an embodiment of the invention. This is advantageous in particular in vehicles, in which not only the mechanical loads but also the limited space available within the vehicle impose high demands on the fuel cell block.

A further advantage of an embodiment of the invention is achieved by the operating-medium control device being a water separator. Water ($H_2O$) is formed when hydrogen ($H_2$) and oxygen ($O_2$) are brought together in a fuel cell. This product water has to be discharged from the fuel cell.

The product water is, for example, entrained by the flow of operating gas which is passed out of the fuel cells and is not consumed in the fuel cells, and has to be removed from this flow. For this purpose, operating gas which has not been consumed in the fuel cells is passed through a water separator, in which the water is separated from the operating gas.

With some types of low-temperature fuel cells, in particular PEM fuel cells, the operating gases are introduced into the fuel cells in humidified form, since the electrolyte of the fuel cell has to be constantly kept moist. In the case of a fuel cell block including fuel cells of this type, a water separator is generally also arranged in the operating-medium feed lines which are used to feed the humidified operating medium to the fuel cells. Humidification water may condense out inside these pipe feed lines while the fuel cells are operating.

To ensure that this condensed humidification water does not flood the fuel cell, a water separator is arranged at least partially integrated in one of the end plates, for example the intermediate plate. The operating gas which has been humidified in the supply part of the fuel cell block is therefore passed through a water separator at or in the intermediate plate immediately before it enters the fuel cell stack. Moreover, this ensures that the water separator is rigidly connected to the end plate in a particularly stable and sealed manner.

It is particularly advantageous for the water separator to be completely integrated in the end plate. This eliminates the need for sealing locations between pipe connections and the water separator completely. Moreover, this is especially efficient at reducing the overall volume. The operating medium is introduced into the end plate, excess humidification or product water is removed from the operating medium in the water separator in or at the end plate, and then the operating medium is removed again from the end plate.

It is expedient for the emptying valve of the water separator to be completely or partially integrated in the end plate. It is also expedient for the water level indicator to be completely or partially integrated in the end plate. A design of this type effectively avoids leaks between the emptying valve or water level and water separator. Moreover, the supply part and therefore the fuel cell block may thus be of particularly compact design.

A further advantage of an embodiment of the invention may be achieved by a connecting passage, which is incorporated in the end plate, for connecting two axial passages which are oriented parallel to the stack direction of the cells. Axial passages inside a fuel cell stack are used to supply the fuel cell with operating gases and cooling water and to dispose of these media.

An example which may be described here is a passage which carries cooling water inside the end plate: depending on the cooling concept of the fuel cell stack, by way of example, cooling water is passed out of the supply part of the fuel cell block into an axial passage, where it is passed through the fuel cell stack, is distributed from the axial passage into the fuel cells of the stack, before collecting again in a further axial passage. At the end of the fuel cell stack, the cooling water is diverted into a further axial passage, which guides the cooling water back to the supply part of the fuel cell block.

The connecting line between the axial passage which collects cooling water and the axial passage which returns the cooling water to the supply part of the fuel cell block is configured as a passage inside the end plate which delimits the fuel cell stack with respect to the outside. In this way, a connecting piece between the two axial passages, together with the sealing locations which are additionally required, is avoided. This increases safety and reliability and saves space. Since the metallic end plates impart stability to the overall fuel cell block, their thickness is generally designed to be such that they can accommodate an operating-medium control device or an operating-medium passage without any problems.

It is expedient for a water separator to be arranged in the connecting passage and integrated in the end plate. With a configuration of this type, an operating gas from which water is to be removed does not have to be passed through additional pipelines to a water separator, but rather has the water removed from it immediately after it exits or immediately before it enters the fuel cell stack. This results in the additional advantage that the operating gas is not subject to any cooling in pipelines which are otherwise required and in which additional water would be precipitated out by condensation. As a result, the operating gas is kept at the temperature of the end plate and can be introduced into the fuel cell stack at this readily controllable temperature.

It is advantageous for the fuel cell block to include a plurality of cascaded fuel cell block stages. In this case, the first axial passage is intended to convey an operating medium out of a fuel cell block stage and the second axial passage is intended to supply an operating medium to a subsequent fuel cell block stage. A fuel cell block which is divided into a plurality of block stages—also known as cascade stages—is particularly suitable for operation in which the hydrogen ($H_2$) and oxygen ($O_2$) from the fuel gas and oxidation gas, respectively, are completely consumed inside the fuel cell block. A block of this type is used in particular for operation with pure hydrogen and pure oxygen, since in this case the operating gases are completely consumed and the fuel cell block does not generate any exhaust gas apart from small quantities of inert gases.

A fuel cell block of this type is distinguished by a number of fuel cell stacks which adjoin one another and are in each case separated from one another, for example, by intermediate plates. The operating gases and also the cooling water are guided through complex pipes or passages leading through the individual cascade stages of the fuel cell block. A large proportion of the pipes in the immediate vicinity of the fuel cell stack can be avoided by the formation of connecting passages inside one or more end plates at the end or between the cascade stages. This avoids a large number of sealing locations and saves the space which is used for the piping which is otherwise required.

It is expedient for the operating-medium control device to be a valve, an actuator, a sensor or a flow monitor. All these operating-medium control devices can be at least partially integrated in an end plate of a fuel cell block without difficulty. This avoids the need for sealing locations between an operating-medium control device of this type and piping, with the result that the safety and reliability of the fuel cell block with respect to faults caused by leaks is increased.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein.

Items which correspond to one another are provided with identical reference symbols throughout the figures.

DETAILED DESCRIPTION OF THE PREFERRED EMBODIMENTS

Figure 1:
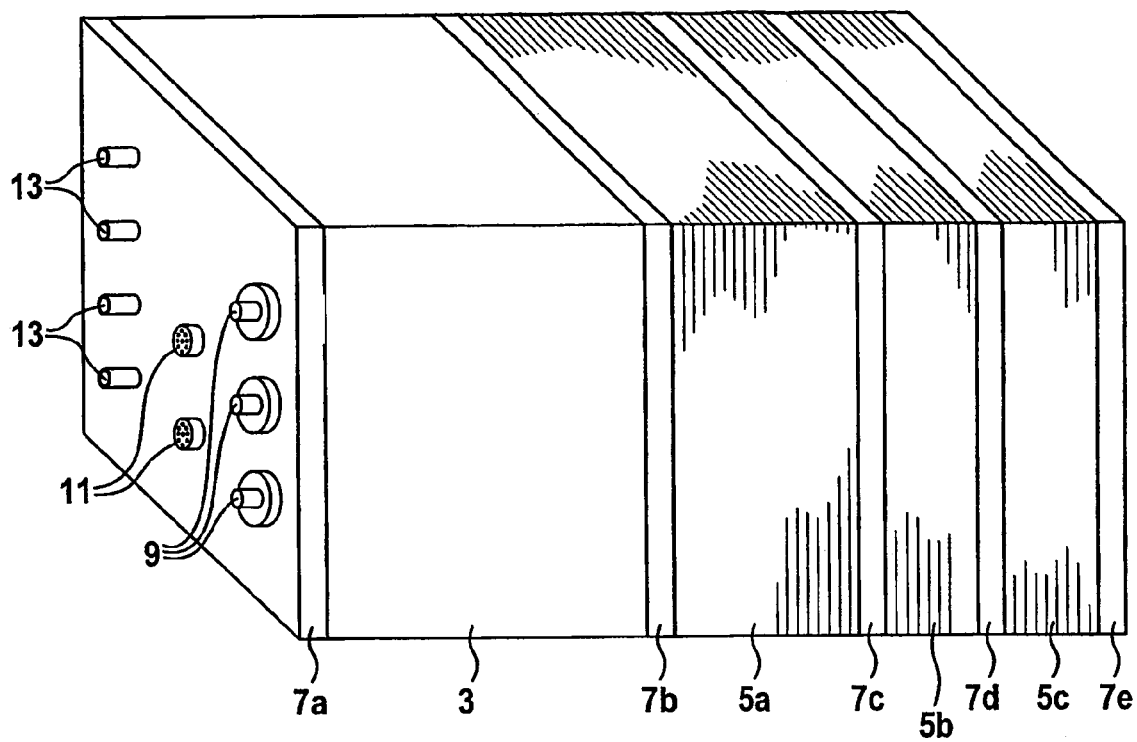
FIG. 1 shows a fuel cell block with a supply part, a humidifying cell stack, two fuel cell stacks and five end plates.

FIG. 1 shows a highly simplified and diagrammatic view of a fuel cell block 1 with a supply part 3, a humidifying cell stack 5a, and two fuel cell stacks 5b, 5c comprising PEM fuel cells. The stacks form two cascade stages of the fuel cell block 1. The supply part 3, the humidifying cell stack 5a and the two fuel cell stacks 5b, 5c are in each case delimited by an end plate 7a, 7b, 7c, 7d, 7e.

The end plate 7a is configured as a connection plate. The connection plate has a number of current connections 9 for tapping off the current which is generated in the fuel cell block 1. Moreover, it has measurement sensor outputs 11 and operating-medium connections 13 which are used to supply and discharge operating media to and from the fuel cell block 1.

The end plates 7b and 7c delimit the humidifying cell stack 5a, and the end plates 7c, 7d and 7e delimit the fuel cell stacks 5b and 5c. The three end plates 7b, 7c and 7d are configured as intermediate plates with a number of operating-medium passages which run through the plates but are not shown in the figure. The end plate 7a which delimits the fuel cell stack 5c closes off the fuel cell block 1 with respect to the outside.

Figure 2:
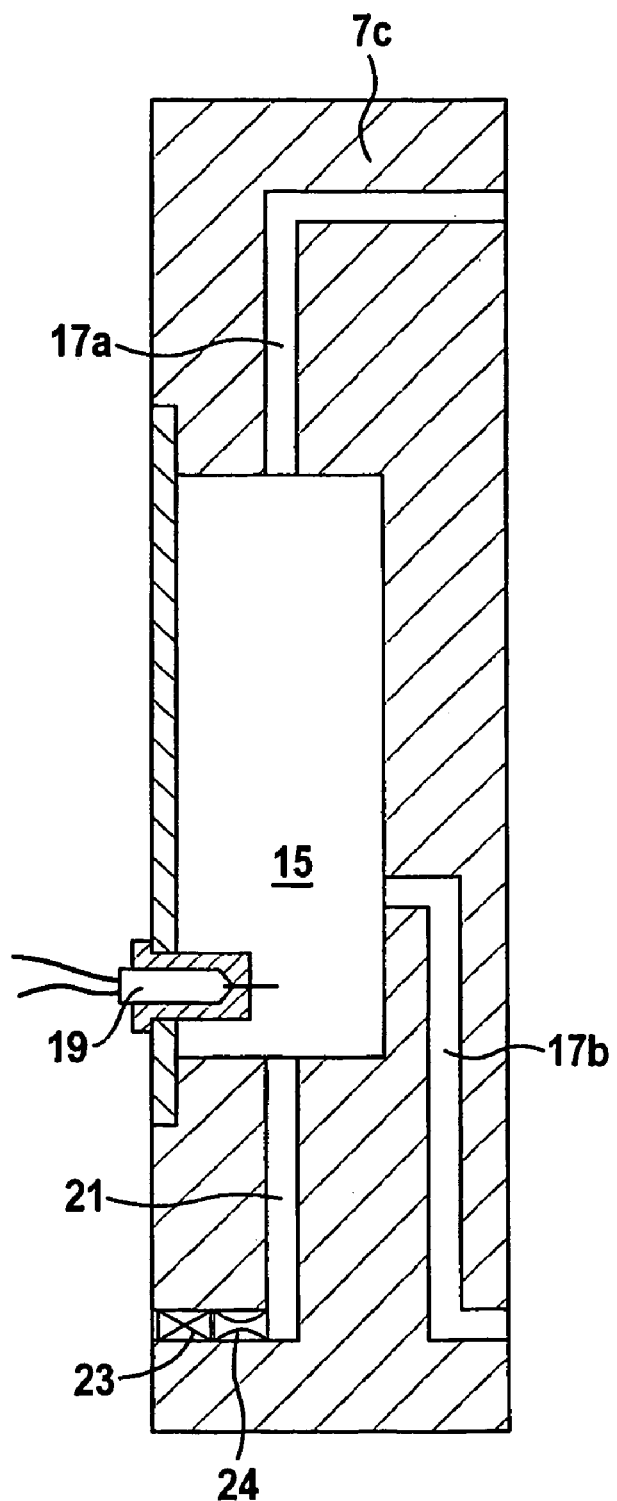
FIG. 2 shows an end plate with integrated water separator.

FIG. 2 shows the end plate 7c, which is arranged as an intermediate plate between the humidifying cell stack 5a and the fuel cell stack 5b of the fuel cell block 1. A water separator 15 is completely integrated in the end plate 7c, and is incorporated in the end plate 7c. A connecting passage 17a opens out into the water separator 15 and connects an axial passage of the fuel cell stack 5b, which runs in the stack direction of the fuel cell stack 5b, to the water separator 15.

While the fuel cell block 1 is operating, oxygen-containing oxidation gas flows through the fuel cells of the fuel cell stack 5b, collects in the axial passage, connected to the connecting passage, of the fuel cell stack 5b and flows through the connecting passage 17b into the water separator 15. In the water separator 15, the product water from the fuel cells of the fuel cell stack 5b which has been entrained in the oxidation gas is separated out of the oxidation gas and collects in the lower part of the water separator 15.

The oxidation gas from which excess product water has been removed then flows onward through the connecting passage 17a into a second axial passage, which leads through the fuel cell stack 5a and to the fuel cell stack 5c. The second axial passage is therefore used to supply the fuel cell stack 5c with oxidation gas. The connecting passages 17a and 17b can be considered as a single connecting passage which connects the first axial passage, which extends into the fuel cell stack 5b, to the second axial passage, which extends into the fuel cell stack 5c.

The water separator 15 includes an operating-medium control device 19 which is configured as a water monitor and is completely integrated in the end plate 7c. If the water level of the product water which has collected in the lower part of the water separator 15 rises above a predetermined level, the water monitor emits a signal to a control unit, which is not shown in more detail in FIG. 2 and opens valve 23 in response to this signal. As a result, the product water is emptied out of the water separator 15 through the drainage passage 21 in the end plate 7c.

An operating-medium control device 24 configured as a flow monitor is arranged in the drainage passage 21. The flow monitor is completely recessed in the drainage passage 21 and is therefore fully integrated in the end plate 7c.

The water separator 15 is completely integrated in the end plate 7c. As such, there is no need for any connecting locations or seals between the water separator 15 and the connecting passages 17a and 17b and the drainage passage 21. Moreover, there is no need for any piping to and from the water separator 15. Thus, routing of the oxidizing agent through the water separator 15 can be effected very safely and reliably. Moreover, the water separator and the connecting passages 17a, 17b, and also the drainage passage 21 with the flow monitor, are of very compact design. This reduces the overall volume of the fuel cell block 1 as a whole.

Figure 3:
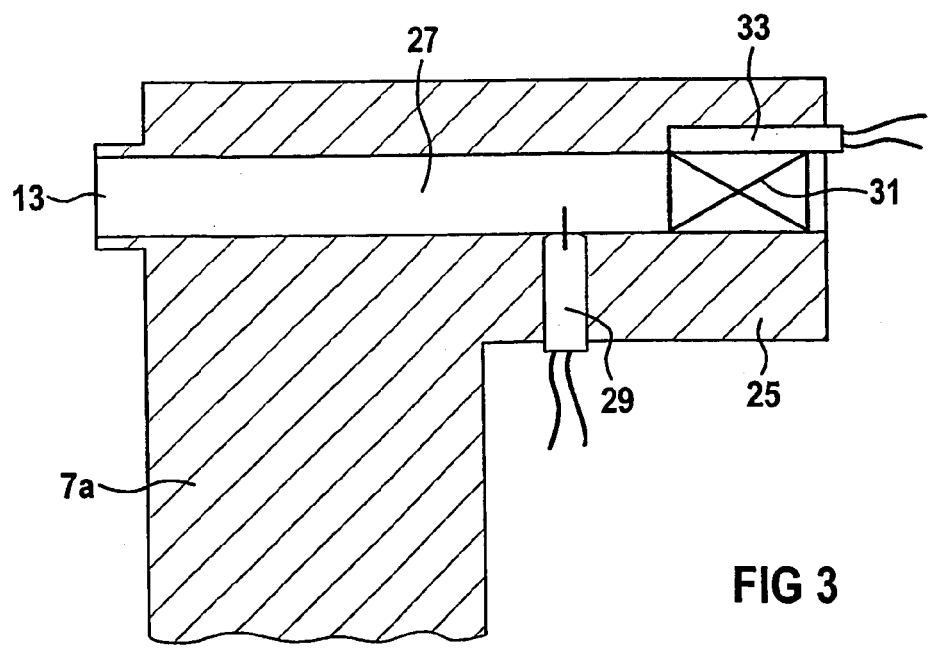
FIG. 3 shows a temperature sensor and a valve integrated in an end plate.

FIG. 3 diagrammatically depicts a section through the end plate 7a configured as a connection plate. The connection plate has a cap 25 through which an operating-medium passage 27 extends. The operating-medium passage 27 connects one of the operating-medium connections 13 to supply devices of the fuel cell block 1 which are arranged in the supply part 3 of the fuel cell block 1. An operating-medium control device 29, which is configured as a temperature sensor, is arranged so as to project into the operating-medium passage 27. The temperature sensor is inserted into the end plate 7a in such a way that it is completely integrated in the end plate 7a. A further operating-medium control device 31, which is designed as a valve, is likewise arranged in the operating-medium passage 27. The operating-medium control device 33, which is designed as the actuator of the valve, is arranged at the valve and, like the valve, is itself inserted into the end plate 7a in such a way as to be likewise completely integrated in the end plate 7a.

Integration of the operating-medium control devices 29, 31 and 33 in the end plate 7a means that they are very strongly and rigidly connected to the end plate 7a. As a result, there are no mechanical loads along the sealing surfaces which surround the operating-medium control devices 29, 31 and 33. This makes it possible to ensure a high degree of reliability in terms of the leaktightness of these sealing locations.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A fuel cell block, comprising:
   a plurality of planar fuel cells stacked on top of one another;
   an end plate;
   an operating gas passage, running through the end plate; and
   a water separator including a lower part for the collection of water, the lower part at least partially arranged in the operating gas passage and at least partially integrated in the end plate.

2. The fuel cell block as claimed in claim 1, wherein the lower part of the water separator is completely incorporated in the end plate.

3. The fuel cell block as claimed in claim 1, further comprising:
   a first and a second axial passage, oriented parallel to a stack direction of the cells; and
   a connecting passage incorporated in the end plate, for connecting the two axial passages, the water separator being arranged in the connecting passage and integrated in the end plate.

4. The fuel cell block as claimed in claim 3, further comprising:
   a plurality of cascaded fuel cell block stages, wherein the first axial passage is provided for the purpose of conveying operating gas out of one cascade stage, and the second axial passage is provided for supplying operating gas to a subsequent cascade stage.

5. A fuel cell block, comprising:
   a plurality of planar fuel cells stacked on top of one another;
   an end plate;
   an operating gas passage running through the end plate; and
   at least one of a water monitor, a flow monitor, a sensor, a valve and an actuator, at least partially arranged in the operating gas passage and at least partially integrated in the end plate.

6. The fuel cell block as claimed in claim 2, further comprising:
   a first and a second axial passage, oriented parallel to a stack direction of the cells; and
   a connecting passage incorporated in the end plate, for connecting the two axial passages, the water separator being arranged in the connecting passage and integrated in the end plate.

7. The fuel cell block as claimed in claim 6, further comprising:
   a plurality of cascaded fuel cell block stages, wherein the first axial passage is provided for the purpose of conveying operating gas out of one cascade stage, and the second axial passage is provided for supplying operating gas to a subsequent cascade stage.

8. The fuel cell block as claimed in claim 5, wherein the at least one of a water monitor, a flow monitor, a sensor, a valve and an actuator is completely incorporated in the end plate.

9. The fuel cell block as claimed in claim 5, further comprising:
   a first and a second axial passage, oriented parallel to a stack direction of the cells; and
   a connecting passage incorporated in the end plate, for connecting the two axial passages, the at least one of a water monitor, a flow monitor, a sensor, a valve and an actuator being arranged in the connecting passage and integrated in the end plate.

10. The fuel cell block as claimed in claim 9, further comprising:
    a plurality of cascaded fuel cell block stages, wherein the first axial passage is provided for the purpose of conveying operating gas out of one cascade stage, and the second axial passage is provided for supplying operating gas to a subsequent cascade stage.

11. A fuel cell block, comprising:
    a plurality of fuel cells;
    an end plate;
    an operating gas channel, running through the end plate; and
    means for controlling an operating gas in the operating gas channel, the means being at least partially arranged in the operating gas channel and at least partially integrated in the end plate.

12. The fuel cell block as claimed in claim 11, wherein the means is completely incorporated in the end plate.

13. The fuel cell block as claimed in claim 12, further comprising:
   a first and a second axial passage, oriented parallel to a stack direction of the cells; and
   a connecting passage incorporated in the end plate, for connecting the two axial passages, the means being arranged in the connecting passage and integrated in the end plate.

14. The fuel cell block as claimed in claim 13, further comprising:
   a plurality of cascaded fuel cell block stages, wherein the first axial passage is provided for the purpose of conveying operating gas out of one cascade stage, and the second axial passage is provided for supplying operating gas to a subsequent cascade stage.

* * * * *